United States Patent [19]

Wurz

[11] Patent Number: 5,550,745

[45] Date of Patent: Aug. 27, 1996

[54] MOVEABLE LABEL PRINTER-APPLICATOR/CONVEYOR LOADER ASSEMBLY

[75] Inventor: Albert Wurz, Doylestown, Pa.

[73] Assignee: Accu-Sort Systems, Inc., Telford, Pa.

[21] Appl. No.: 269,209

[22] Filed: Jun. 30, 1994

[51] Int. Cl.[6] .................................................. G06F 17/00
[52] U.S. Cl. ........................ 364/478.03; 414/274; 156/360
[58] Field of Search ................................... 364/478, 479; 198/364; 414/274, 278, 273; 156/360, 367, 357, 350, 543, 565, DIG. 1, DIG. 2, DIG. 24

[56] References Cited

U.S. PATENT DOCUMENTS

| | | | |
|---|---|---|---|
| 3,334,725 | 8/1967 | Wardlaw et al. | 198/364 |
| 3,528,566 | 9/1970 | Weir | 214/16.4 |
| 3,687,312 | 8/1972 | Weir | 214/16.4 A |
| 3,734,311 | 5/1973 | Thompson et al. | 414/273 |
| 3,970,831 | 7/1976 | Hegyi | 235/151.1 |
| 4,017,350 | 4/1977 | Thomas | 156/384 |
| 4,074,120 | 2/1978 | Allred et al. | 235/419 |
| 4,363,693 | 12/1982 | Fujii et al. | 364/478 X |
| 4,554,042 | 11/1985 | Marchetti | 156/350 |
| 4,615,757 | 10/1986 | Treiber | 156/350 |
| 4,707,211 | 11/1987 | Shibata | 156/354 |
| 4,786,229 | 11/1988 | Henderson | 414/274 X |
| 4,812,629 | 3/1989 | O'Neil et al. | 414/274 X |
| 4,844,771 | 7/1989 | Crankshaw et al. | 156/387 |
| 5,133,827 | 7/1992 | Ratermann | 156/361 |
| 5,216,618 | 6/1993 | Arita et al. | 414/274 X |
| 5,232,539 | 8/1993 | Carpenter et al. | 156/360 |
| 5,254,189 | 10/1993 | Hirobe et al. | 156/360 X |
| 5,271,703 | 12/1993 | Lindqvist et al. | 364/478 X |
| 5,328,316 | 7/1994 | Hoffmann | 364/478 X |
| 5,342,461 | 8/1995 | Murphy | 156/64 |
| 5,425,823 | 6/1995 | Woodside, III | 156/360 X |

FOREIGN PATENT DOCUMENTS

| | | | |
|---|---|---|---|
| 3622817 | 1/1987 | Germany | B65G 47/10 |
| 9323292 | 11/1993 | WIPO . | |

Primary Examiner—Roy N. Envall, Jr.
Assistant Examiner—Brian C. Oakes
Attorney, Agent, or Firm—Volpe and Koenig, P.C.

[57] ABSTRACT

A moveable label printer-applicator/conveyor loader assembly for loading articles onto a conveyor comprises a frame mounted for movement along a conveyor path and a controller. The controller receives data from a host computer which specifies an article to be selected and actuates a drive motor to move the assembly to the selected bin location. The quantity of articles to be picked is displayed to an operator via a CRT display. Sensors detect the profile of articles loaded onto the conveyor and transmit this data to the controller. After the controller verifies that the correct article has been selected, a labeler prints and applies a label to each article.

4 Claims, 2 Drawing Sheets

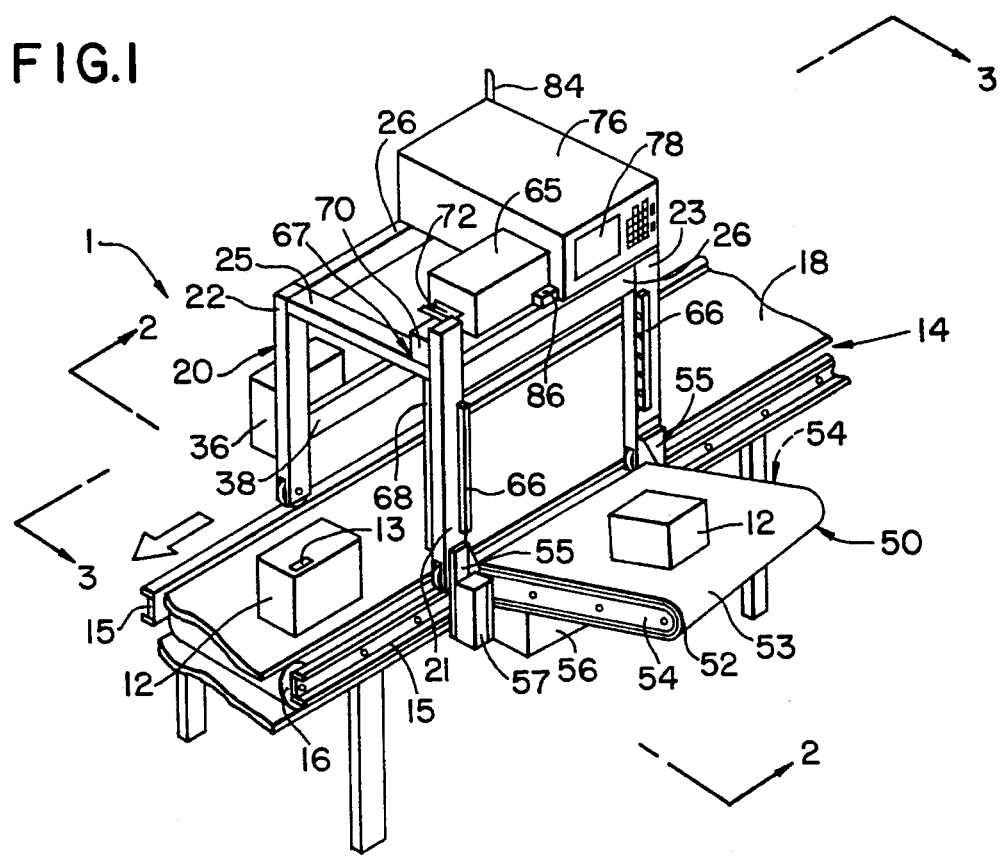
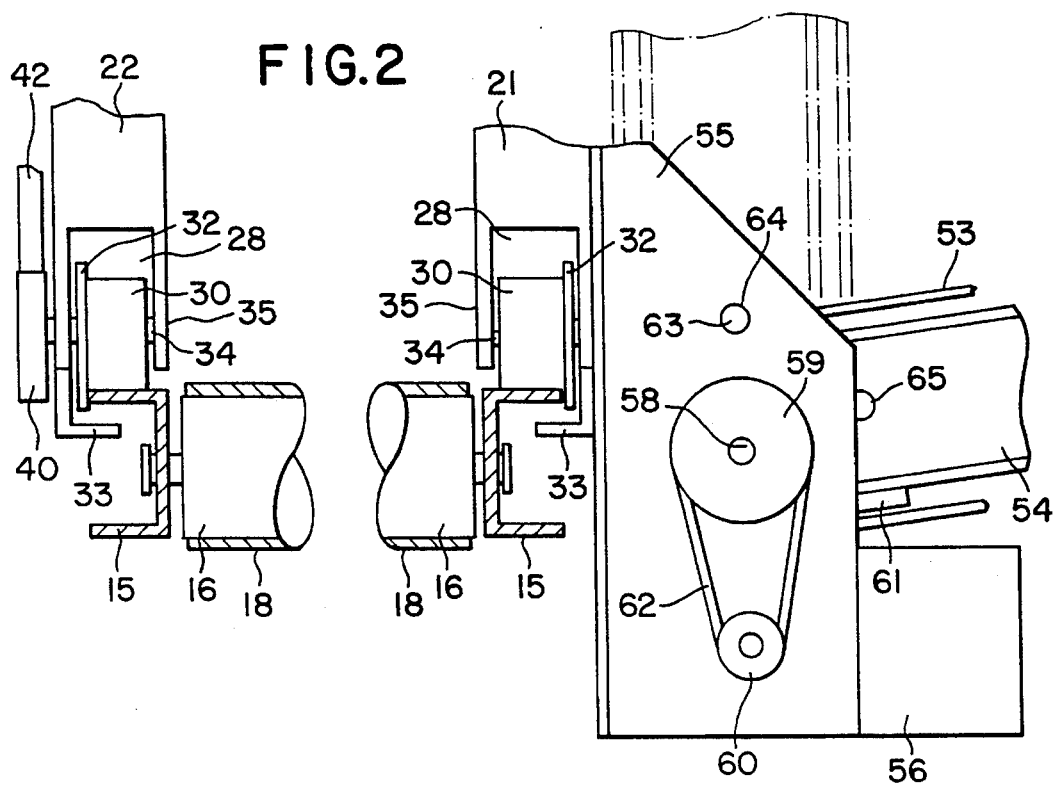

MOVEABLE LABEL PRINTER-APPLICATOR/CONVEYOR LOADER ASSEMBLY

BACKGROUND OF THE INVENTION

1. Field of the Invention

The present invention generally relates to a system for use in picking and labeling packages in a warehouse environment. More particularly, the present invention relates to a label applicator which is used in conjunction with a conveyor loader for loading packages from a storage location onto a conveyor and applying shipping labels to the packages as they are loaded.

2. Description of the Prior Art

In the recent past, there have been many improvements in warehouse automation to cut costs and increase productivity. Automated article storage and retrieval systems have been used in many applications to reduce manual handling of articles. However, in some applications it is still necessary for articles to be manually picked from storage for shipping or further processing. In many warehouse environments of this type, pick conveyors are located adjacent to rows of article storage locations or bins to facilitate the loading and movement of articles. The current method for picking an order in this type of warehouse environment is to provide a worker with preprinted labels for items to be picked in selected storage areas. Each label is printed with article identification as well as shipping or destination information. Once the desired articles are found, the articles are then placed on a conveyor which carries the articles to a shipping point or to a destination for further processing. The labels may be manually applied to the articles before or after the articles are placed on the conveyor.

In the warehouse environment described above, once the worker leaves the printing area with the labels, picking for those labels is generally completed prior to returning for the next batch of labels. This promotes inefficiency because picking additional articles for new orders from the selected bin location must wait until the worker returns to the printing area. Additionally, there is concern about the lack of verification that the worker has applied the label to the correct article.

It is desirable to improve the efficiency of this type of picking operation and to provide a means for verification of the picked articles.

SUMMARY OF THE INVENTION

The present invention provides a moveable label printer-applicator/loader comprising a frame mounted for movement along a conveyor path. A side loading extension is attached to the frame. Labeling means for applying a label to an article placed on the conveyor are attached to the frame. Means are provided for moving the frame along the conveyor path between different loading locations.

The present invention also provides a method for picking articles from storage bins, labeling the articles and loading the articles onto a conveyor for transport. The method is comprised of the following steps:

(1) Providing a label printer-applicator/loader having a frame mounted for movement along a conveyor path with an extension mounted on the frame for loading articles onto the conveyor. Display means is mounted on the frame to display pick data to an operator. Sensor means are provided for detecting the height of an article loaded onto the extension and transmitting the article height data to a controller, mounted to the frame. Labeling means for applying the label to the article is attached to the frame. Scanning means for identifying a desired bin location and transmitting a bin identification signal to the controller is attached to the frame. Means for moving the frame along the conveyor path are attached to the frame. The controller receives article identification, bin location, pick quantity, shipping information, article height and bin verification signals, verifies the bin identification and directs the display means to display the pick data. After an article is placed on the loading extension, the controller verifies that the correct article has been picked and directs the labeling means to print and apply the label to the article.

(2) Sending article identification, bin location, pick quantity and shipping information signals to the controller.

(3) Moving the label printer-applicator/conveyor loader to the desired bin location.

(4) Verifying the correct bin location.

(5) Displaying a quantity of articles to be picked.

(6) Loading a quantity of articles onto the extension in accordance with the pick data displayed on the display means.

(7) Verifying the height of the loaded article.

(8) Printing a label with the shipping information; and applying it to the article.

It is an object of this invention to provide a label printer-applicator/conveyor loader which receives a real time information signal regarding article identification, bin location, pick quantity and shipping information for articles to be picked.

It is an object of this invention to provide a moveable label printer-applicator/conveyor loader.

BRIEF DESCRIPTION OF THE DRAWINGS

FIG. 1 is a perspective view of a label printer applicator/conveyor loader assembly in accordance with the present invention.

FIG. 2 is a section view taken along line 2—2 in FIG. 1.

DESCRIPTION OF THE PREFERRED EMBODIMENT

Figure 3:
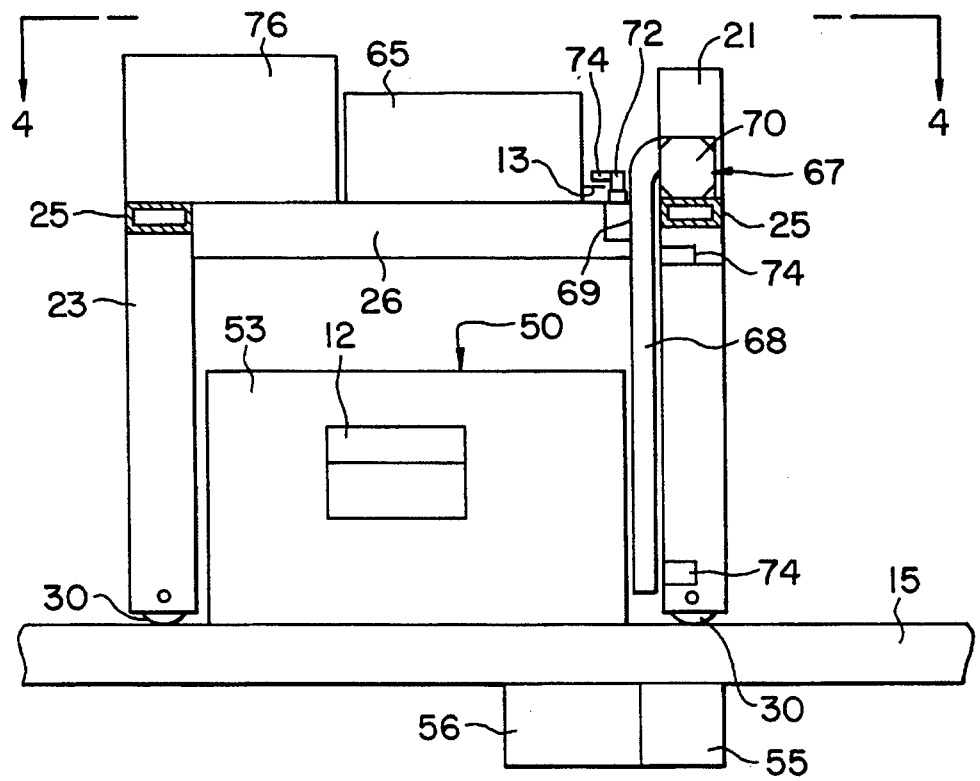
FIG. 3 is a section view taken along line 3—3 in FIG. 1.

A movable label printer-applicator/conveyor loader assembly 1 (PACL assembly) in accordance with the present invention is shown. The PACL assembly 1 has a sliding gantry frame 20 which travels along the side rails 15 of a conveyor 14. The conveyor 14 is illustrated as having rollers 16 which support a conveyor belt 18; however, the specific form of the conveyor is not central to the invention. The sliding gantry frame 20 is comprised of vertical corner posts 21, 22, 23 and 24. Cross members 25 are connected between the posts 21 and 22 and the posts 23 and 24. Longitudinal members 26 are connected between the respective front and rear posts 21 and 23 and posts 22 and 24.

As shown in FIG. 2, each of the vertical posts 21–24 has a slot 28. Wheels 30, having a lip 32, are mounted in the slots 28 on axles 34 which extend through apertures 35. Lip 32 extends down past the edge of the side rails 15 to maintain the frame assembly 20 on the side rails 15. End caps 33 are attached to the posts 21–24 and provide an auxiliary retention means to prevent the frame assembly 20 from being dislodged from the rails 15.

A drive motor/gearbox assembly 36 is attached to frame 20. A pulley 40 is affixed to the outboard end of the axle 34 of at least one wheel 30, as shown in FIG. 2, providing a means to drive the PACL assembly 1 along the conveyor path. A toothed belt 42 connects the motor/gear box 36 to the pulley 40.

In the preferred embodiment, a side extending conveyor assembly 50 is attached to the side of the frame 20 to allow for easier loading of the conveyor 14. The side conveyor 50 comprises a conveyor belt 53 mounted on rollers 52 which are supported by side rails 54. The path of the side conveyor 50 is generally perpendicular to the path of conveyor 14. Supports 55 are used to pivotally connect the side conveyor 50 to the vertical posts of frame 20. A shaft 58 from the drive roll of conveyor 50 extends through the supports 55 on each side of the conveyor 50. Stops 61, affixed to the supports 55, support the side rails 54 when the side conveyor 50 is in the down position. The side conveyor 50 can be pivoted about the shaft 58 to a vertical, stowed position, shown in phantom lines in FIG. 2, and be retained in the stowed position by inserting a removable pin 63 through apertures 64 and 65 in support 55 and side rail 54. A motor/gear box assembly 56 is mounted beneath the conveyor extension 50. Belt 62 connects pulley 60 from the motor/gear box 56 with pulley 59 mounted on the shaft 58. The motor/gear box assembly is used to drive the side conveyor 50.

Referring again to FIG. 1, a light curtain assembly 66 is mounted on the vertical posts on either side of the side conveyor 50. The light curtain 66 is connected to a controller 76 and is used to measure the profile of an article 12 as it travels from the side conveyor 50 to the main conveyor 14. Printer 65 and label applicator assembly 70 are mounted to the frame 20. The label applicator 70 receives labels from the label printer 65 and applies them to the articles 12 being loaded onto the conveyor 14.

Figure 4:
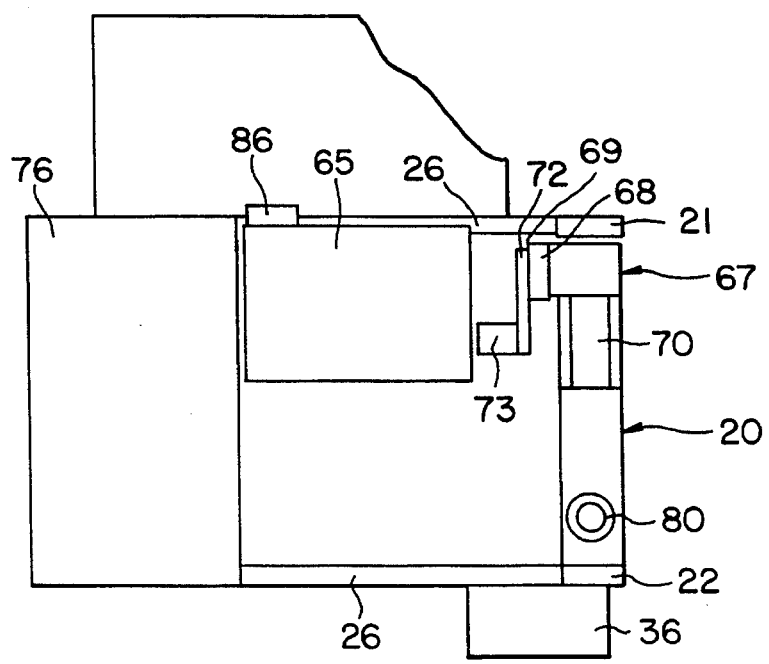
FIG. 4 is a section view taken along line 4—4 in FIG. 3.

In an alternative embodiment, the side conveyor 50 may comprise a plurality of skate wheel rollers inclined toward the conveyor 14. A package placed on the surface will freely roll onto the conveyor 14 through the light curtain 66. Although use of a side extending conveyor assembly 50 is preferred, packages from the bins can be placed directly on the conveyor 14. However, care must be exercised in manual loading so that a valid profile measurement is obtained. As shown in FIGS. 3 and 4, the label applicator 67 is comprised of a vertical actuator 68 with a carriage 69. The vertical actuator 68 is attached to the corner post 21 by brackets 74. A motor 70 drives the vertical actuator 68 to carry the label transport arm 72, from a label receiving position, adjacent to the printer 65, to a label applying position. The label 13 is picked up from the printer 65 and retained on a vacuum/blow plate 73, attached to the end of the label transport arm 72, by a vacuum. Based on the article height, the vertical actuator 68 repositions the label transport arm 72 to the label applying position. The label 13 is then applied through the reversal of the vacuum and the application of a blast of gas to the vacuum/blow plate 73 to blow the label onto the article surface.

In lieu of the vacuum assembly, the label 13 picked up from the printer 65 can be retained by a clamp attached to the end of the label transport arm 72. The label 13 is then applied to the article by contact and is tamped to ensure adhesion.

Referring again to FIG. 1, a scanner 86 is mounted on the near side of the frame 20 and is connected to the controller 76. The scanner 86 reads bin identification markers affixed adjacent to the conveyor 14 at the article bin or storage locations. The bin identification markers are provided to enable the PACL assembly 1 to identify the correct bin location before displaying the pick order. The preferred scanner for this application is the Model 30 line scanner, manufactured by Accu-Sort Systems, Inc., Telford, Pa.

The controller 76 has a CRT display 78 and is mounted on top of the frame 20. The controller 76 also includes a communication system 84 which provides communication with a remote host computer. The communication system 84 may utilize radio frequency transceivers, infrared detectors/transmitters, or hard wiring to send communication signals between the remote computer and the controller 76. Communication systems suitable for this application are well known to those skilled in the art.

The host computer signals the controller 76 via the communication system 84 with the article identification and size, pick quantity, bin location and labeling information. The controller 76 processes the information and actuates the motor/gear box 36. In response to the controller signal, motor/gear box 36 propels PACL assembly 1 to the proper bin location. Scanner 86 scans the bin identification label and transmits this information to the controller 76 for location verification. When the proper location is verified, the display 78 indicates articles to be picked from the bin or article storage location. Preferably each bin contains only a single type of article type of article, so that only quantity information needs to be displayed for the picker.

A picker loads the desired number of articles 12 onto the side conveyor 50. Each article 12 is carried past the light curtain 66 onto the moving conveyor belt 18. The light curtain 18 detects the article profile and signals article height data to the controller 76. The controller 76 verifies the article size against the article size data provided by the host computer to ensure that the proper article has been picked.

If article size has been verified, the label printer 65 prints a label 13 with the required label information and presents it at the label feed position. The vertical actuator 68 moves the label transport arm 72 into position above the printer label feed position. A sensor 88 located on vertical post 22 indicates when the leading edge of the article 12 is beneath the label transport arm 72. A vacuum is applied to the vacuum/blow plate 73 to releasably retain the label 13. The controller then signals the motor assembly 70 to move the vertical actuator 68 to the label applying position. The label 13 is applied to the upper surface of the article 12 by reversing the vacuum and applying a blast of gas against the retained label 13.

As each article 12 is labeled, the remaining number of articles to be picked, indicated by the display 78, is incrementally reduced. During the picking operation, the host computer can update the number of articles to be picked through communication with the communication system 84. When no additional articles from the selected bin are required, the controller 76 signals the host computer through the communication system 84. The host computer then signals the article identity, quantity, bin location and label information for the next article to be picked, and the process is repeated.

In an alternative embodiment of the invention, the PACL I is not driven but is manually moved by the picker from location to location on rails 15. Scanner 86 scans the bin identification label and transmits this information to the controller 76 for location verification. When the PACL assembly 1 has reached the correct bin, the controller 76 actuates a breaking mechanism. As a second alternative, the PACL 1 can releasably engage the moving conveyor belt and be pulled by the belt to the next picking location.

Preferably either the host computer or the controller 76 determines the most efficient sequencing of articles to be picked based upon bin location in order to minimize the travel of the PACL assembly 1. Alternatively, the PACL assembly 1 can be driven past each bin in succession with the scanner 86 scanning the bin identification labels. The PACL assembly 1 is then stopped each time the PACL assembly reaches a bin containing articles to fill a specific order. After reaching the last bin, the PACL assembly 1 can then travel in the reverse direction to fill another order.

It will be understood by those skilled in the art that the preferred embodiments described herein are only illustrative of the invention and that numerous variations can be derived without departing from the scope and spirit of the invention.

I claim:

1. A moveable label printer-applicator/conveyor loader comprising:

a frame mounted for movement along a path defined by a conveyor;

means for locating articles to be loaded on the conveyor as the frame is moved along said path;

labeling means, attached to the frame, for labeling a selected article; and controller means which receives a signal that includes data comprising pick quantity and location information for a selected article, directs the frame to the article location, verifies the selected article, and directs the labeling means to print and apply a label to the article.

2. The moveable label printer-applicator/conveyor loader of claim 1 further comprising a loading extension mounted on the frame for loading articles onto the conveyor.

3. A moveable label printer-applicator/conveyor loader assembly for loading articles onto a conveyor comprising:

a frame mounted for movement along a conveyor path;

an extension mounted on the frame for loading articles onto the conveyor;

display means mounted on the frame which displays pick data to an operator;

sensor means for detecting a height of an article being loaded on the extension and transmitting article height data to a controller;

labeling means, attached to the frame, for applying a label to the article;

transport means for moving the frame along the conveyor path; and controller means which receives a pick quantity, article height and bin location signal, directs the transport means to move the assembly to a signaled bin location, signals the display means to display the pick quantity, verifies the height of a loaded article, and directs the labeling means to print and apply the label to the article.

4. A method for picking articles from storage bins, labeling the articles with shipping data and loading the articles onto a conveyor belt for transport comprising:

providing a label printer-applicator/conveyor loader having a frame mounted for movement along a conveyor path, and an extension mounted on the frame for loading articles onto the conveyor, display means mounted on the frame which displays pick data to an operator, means for detecting a height of an article being loaded on the extension and transmitting article height data to a controller, labeling means, attached to the frame, for applying a label to an article, scanning means for identifying a desired bin location and transmitting a bin identity signal to the controller, means for moving the frame along the conveyor path; and controller means for receiving article identification, bin location, pick quantity and shipping information signals and article height and bin verification signals and for directing the display means to display the pick data, verifying the desired bin identification, verifying that the correct article has been picked based on the article height and directing the labeling means to print and apply the label to the article;

sending an article identification, bin location, pick quantity and shipping information signal to the controller;

moving the label printer-applicator/conveyor loader to the desired bin location;

verifying the correct bin location;

loading a desired article onto the extension in accord with the pick data displayed on the display means;

verifying the article height of the loaded article; and printing a label with the shipping information and applying it to the article.

* * * * *